US009818161B2

(12) United States Patent
Voas et al.

(10) Patent No.: US 9,818,161 B2
(45) Date of Patent: Nov. 14, 2017

(54) CREATING A SOCIAL NETWORK MESSAGE FROM AN INTERFACE OF A MOBILE DEVICE OPERATING SYSTEM

(75) Inventors: Edward Voas, Mountain View, CA (US); Justin Lam, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 261 days.

(21) Appl. No.: 13/488,647

(22) Filed: Jun. 5, 2012

(65) Prior Publication Data

US 2013/0326368 A1 Dec. 5, 2013

(51) Int. Cl.

| | |
|---|---|
| ***G06F 15/16*** | (2006.01) |
| ***G06F 3/01*** | (2006.01) |
| ***G06Q 50/00*** | (2012.01) |
| ***G06Q 50/32*** | (2012.01) |

(52) U.S. Cl.

CPC ............. *G06Q 50/01* (2013.01); *G06Q 50/32* (2013.01)

(58) Field of Classification Search

CPC ..... G06Q 50/01; H04L 63/083; H04L 9/3226; H04L 63/0815; H04L 12/1813; G06F 21/41

USPC .......... 726/5, 3, 8–9; 713/168, 185; 715/753

See application file for complete search history.

(56) References Cited

U.S. PATENT DOCUMENTS 8,839,367 B2 * 9/2014 Rathbun ............ G06Q 20/3276 726/3
9,326,088 B2 * 4/2016 Burke ................... H04L 67/125
2010/0042511 A1 2/2010 Sundaresan
2011/0047229 A1 2/2011 Sinha
2011/0099612 A1 * 4/2011 Lee et al. .......................... 726/6
2011/0112899 A1 * 5/2011 Strutton et al. ............ 705/14.41
2011/0151838 A1 * 6/2011 Olincy .................... H04M 1/64 455/412.1
2011/0173268 A1 7/2011 Cai
2011/0302630 A1 * 12/2011 Nair ........................ G06F 21/41 726/4
2012/0072494 A1 * 3/2012 Wong ..................... G06Q 50/01 709/204
2013/0080544 A1 * 3/2013 Lyons ........................... 709/206
2013/0174244 A1 * 7/2013 Taveau et al. .................... 726/9

(Continued)

OTHER PUBLICATIONS

Mitter—Bitter monitoring system using Android smartphone's, Anand et al, IEEE 2012, Computing, Communication and Applications (ICCCA), 2012 International Conference, 10.1109/ICCCA.2012.6179176.*

(Continued)

*Primary Examiner* — Jahangir Kabir
(74) *Attorney, Agent, or Firm* — Blank Rome LLP

(57) ABSTRACT

A mobile device operating system level routine obtains social network access parameters that allow access to one or more social network accounts of a user of the device. The access parameters are stored in operating system level memory of the mobile device. Through an operating system interface of the mobile device, a user can create a social network message to be communicated via the one or more social network accounts using the stored access parameters. A single social network message may be communicated via multiple social network accounts with multiple social network platforms. The uniform operating system interface allows a user to communicate messages via multiple social network accounts without using multiple user level applications.

22 Claims, 5 Drawing Sheets

(56) References Cited

U.S. PATENT DOCUMENTS

2013/0254850 A1* 9/2013 Alison .................. H04W 4/206
726/4

OTHER PUBLICATIONS

Routing through an integrated communication and social network, Bigrigg et al, IEEE 2009, Military Communications Conference, 2009. MILCOM 2009. IEEE, 10.1109/MILCOM.2009.5379848.*

* cited by examiner

CREATING A SOCIAL NETWORK MESSAGE FROM AN INTERFACE OF A MOBILE DEVICE OPERATING SYSTEM

BACKGROUND

This disclosure relates generally to providing a means of generating a social network message from a mobile device.

Online social network platforms allow users to locate, establish social network relationships with, and communicate with other social network users. Using a social network identity (e.g., an identity associated with a social network account), a user can share information with family, friends, and other acquaintances with whom the user has established a social network relationship. Likewise, the user can receive information from social network users with whom the user has established a social network relationship. Based on the ability to share information with a group of people who would likely be most interested in such information, social networking platforms have become an extremely popular way for people to communicate and stay in touch.

As the functionality of mobile devices has increased, these devices have become a natural means of communicating using social network platforms. Mobile devices are often in the possession of a user, often include a digital camera for capturing still or video images, are often aware of their location (e.g., through GPS location information), and often have Internet connectivity. Based on these factors, mobile devices provide an efficient mechanism to communicate messages and digital media via a social network platform while a user is on the go.

There are, however, certain drawbacks to social network communications using mobile devices. For example, communicating via a social network account from a mobile device requires that a client-side social network application be installed on the device. Typically, a client-side social network application for a social network platform provides most, if not all, of the functionality available through a web interface of the social network platform. Therefore, in addition to allowing a user to create social network messages, a client-side social network application will also generally allow a user to view messages communicated by their social network friends, create and respond to friend requests, etc.

If a mobile device user simply wants to create a social network message, launching a client-side social network application and browsing through the application to utilize the desired functionality may be cumbersome. Moreover, a mobile device user may have social network accounts through multiple social network platforms. If the user wants to communicate a similar message using each of their social network accounts, the user would have to launch a client-side application for each of the social network platforms and compose a separate message from within each client-side application. This process may be more time consuming than the user is willing to accept.

SUMMARY

In one embodiment, a program storage device includes mobile device operating system instructions to obtain access parameters for one or more social network accounts. The access parameters may be stored in an area of memory of the mobile device that is designated for use by the operating system. A message entered through an interface of the mobile device operating system may be communicated, using the access parameters, as a social network message via at least one of the one or more social network accounts.

In another embodiment, a method includes obtaining, by an operating system of a mobile device, credentials for a social network identity of a user of the mobile device. The credentials may be sent to a server-side social network application and, in response, a token that allows the mobile device to communicate with the server-side social network application on behalf of the user may be received. The token may be stored in a memory of the mobile device that is designated for use by the operating system. A message input through an interface of the mobile device operating system may be sent, along with the token, to the server-side social network application.

In still another embodiment, a program storage device includes instructions to display, on a mobile device, an operating system interface that includes one or more selectable icons that are each representative of one or more social network accounts of a user of the mobile device. In response to the receipt of a selection of one or more of the icons corresponding to multiple social network accounts, the instructions may cause the display of a text entry field on the mobile device. A message entered in the text entry field may be transmitted as a social network message via the multiple social network accounts that correspond to the one or more selected icons.

DETAILED DESCRIPTION

This disclosure pertains to systems, methods, and computer program products for providing a mobile device operating system interface that allows a user to communicate a social network message. In general, techniques are disclosed for obtaining and storing a user's social network credentials at the operating system level of a mobile device such that the credentials are accessible to the operating system when a user generates a social network message through the operating system interface.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the design of mobile device operating systems having the benefit of this disclosure.

Figure 1:
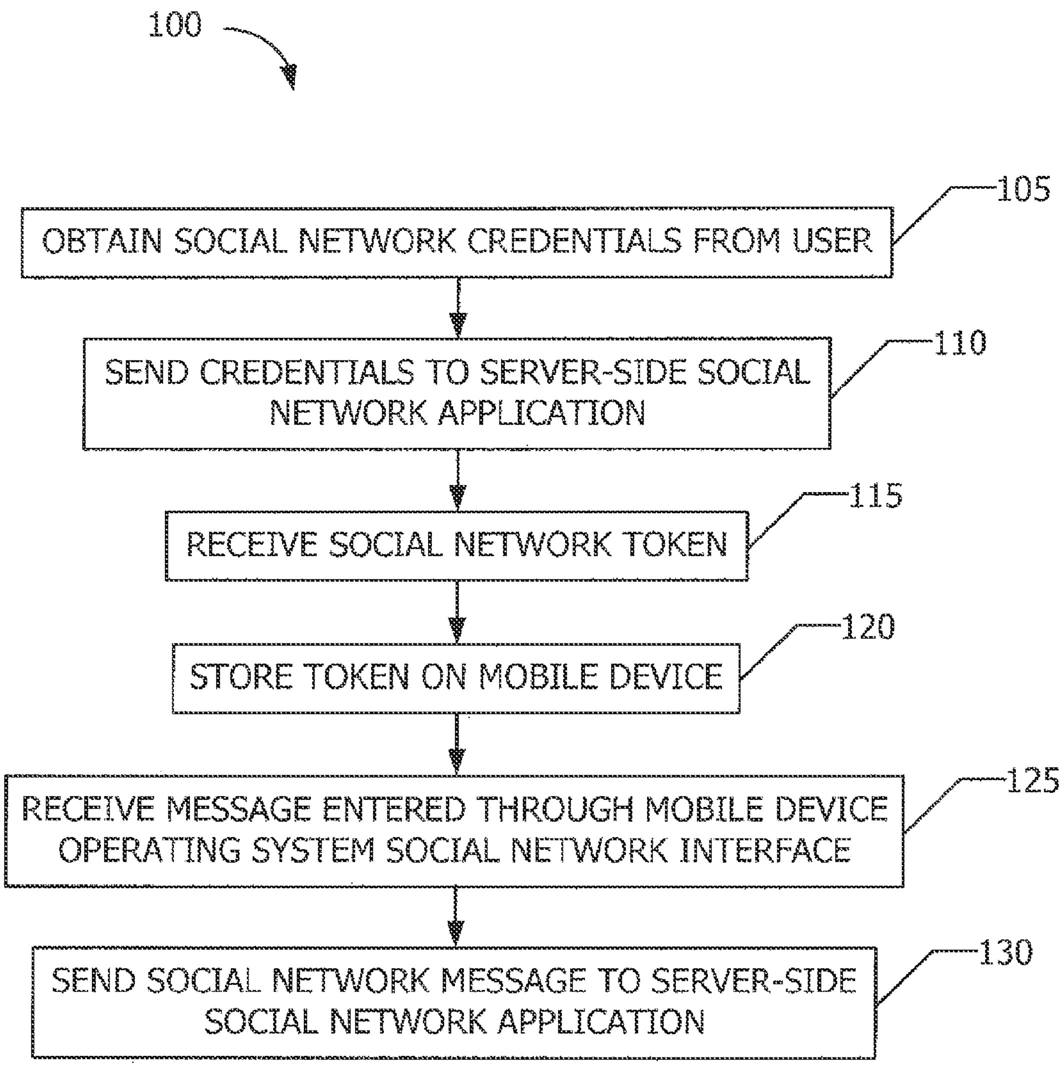
FIG. 1 is a flowchart in accordance with one embodiment illustrating a process by which an operating system of a mobile device obtains a user's social network credentials and provides an interface through which a user can communicate social network messages.

Referring to FIG. 1, an operation 100 of a mobile device operating system obtains a user's social network credentials (block 105). In one embodiment, the user's social network credentials may include a user name and password combination that allows the user to communicate via the social network using a social network identity. Example social networks may include Facebook®, Twitter®, and LinkedIn®. (FACEBOOK is a registered trademark of Facebook, Inc. TWITTER is a registered trademark of Twitter, Inc. LINKEDIN is a registered trademark of LinkedIn Corporation.) Other social networks will be known by those of skill in the art and include any online service, platform, or website that enables a user to communicate with people in an established group (e.g., a group of users having a social network relationship).

The user's social network credentials may be obtained by the mobile device operating system in a variety of manners. In one embodiment, the user may provide the social network credentials as a direct input. The provision of social network credentials as a direct input may occur as a result of a prompt from the mobile device operating system. For example, the user may be prompted to provide their social network credentials a first time the mobile device is activated, when the user attempts to invoke operating system functionality that requires the social network credentials, etc. The user may also provide the social network credentials without being prompted. For example, the user may enter the social network credentials as a mobile device setting. The credentials entered as a mobile device setting may be stored in a memory of the mobile device that is designated for use only by the operating system. In another embodiment, the user's social network credentials may be obtained by the mobile device operating system automatically. For example, the operating system may request the social network credentials from a client-side social network application installed on the device. The client-side social network application may store the user's social network credentials, and, upon receiving an operating system request to share the credentials, the client-side social network application may prompt the user to allow the credentials to be provided to the operating system such that the user can generate social network messages directly through the operating system interface.

After obtaining the user's social network credentials, the operating system may send the credentials to a server-side social network application (block 110). In one embodiment, the social network credentials may be sent in an encrypted form. In the illustrated embodiment, the social network credentials may be presented to the server-side social network application as a request to obtain a token that will allow the device to communicate with the server-side social network application on behalf of the user. The server-side social network application may use the social network credentials to identify the user's social network account and to authenticate the request. In one embodiment, the server-side social network application may perform an external authentication operation to ensure that the user consents to the provision of a social network token that uniquely identifies the user's social network account and allows the device to communicate with the server-side social network application on behalf of the user. For example, after identifying the social network account associated with the provided credentials, the server-side social network application may generate an email message to an email address associated with the account that prompts the user to verify the request for the social network token.

If the user is properly authenticated, the mobile device operating system may receive the social network token from the server-side social network application (block 115). In one embodiment, the social network token may be sent in an encrypted form. The social network token may be a random series of bits generated by the server-side social network application. In still another embodiment, the social network token may be device-specific. In such an embodiment, the social network token may only provide access to the user's social network account when presented along with a unique identifier of the device that requested the token. If the token is successfully received by the operating system, the social network credentials may be discarded as the token may allow communications with the server-side social network application on behalf of the user. The social network credentials obtained from the user and the social network token obtained from the server-side social network application may each be described as access parameters that enable access to the user's social network account.

The social network token can be stored on the mobile device to be used when a user attempts to send a social network message (block 120). In one embodiment, the social network token may be stored in a memory location that is inaccessible to any application software that may run on the mobile device. In one embodiment, the social network token may be stored in a segregated kernel space established by the mobile device operating system. In one embodiment, the social network token may be stored in an encrypted form. The social network token may be accessible to the mobile device operating system to communicate social network messages on behalf of the user.

The mobile device operating system may subsequently receive a message entered by the user through a social network message interface of the operating system (block 125). In one embodiment, the message may contain text entered through the social network message interface of the operating system. Upon receiving the message entered through the operating system interface, the message may be sent by the mobile device operating system to the server-side social network application along with the social network token (block 130). In one embodiment, the message and the social network token may also be communicated with a unique identifier of the mobile device. The server-side social network application may utilize the social network token to identify the user's social network account. The message may then be communicated as a social network message via the user's social network identity. As such, a user may communicate a social network message from a mobile device through an interface built into an operating system of the mobile device without launching a client-side social network application or even having such an application on the device.

Figure 2:
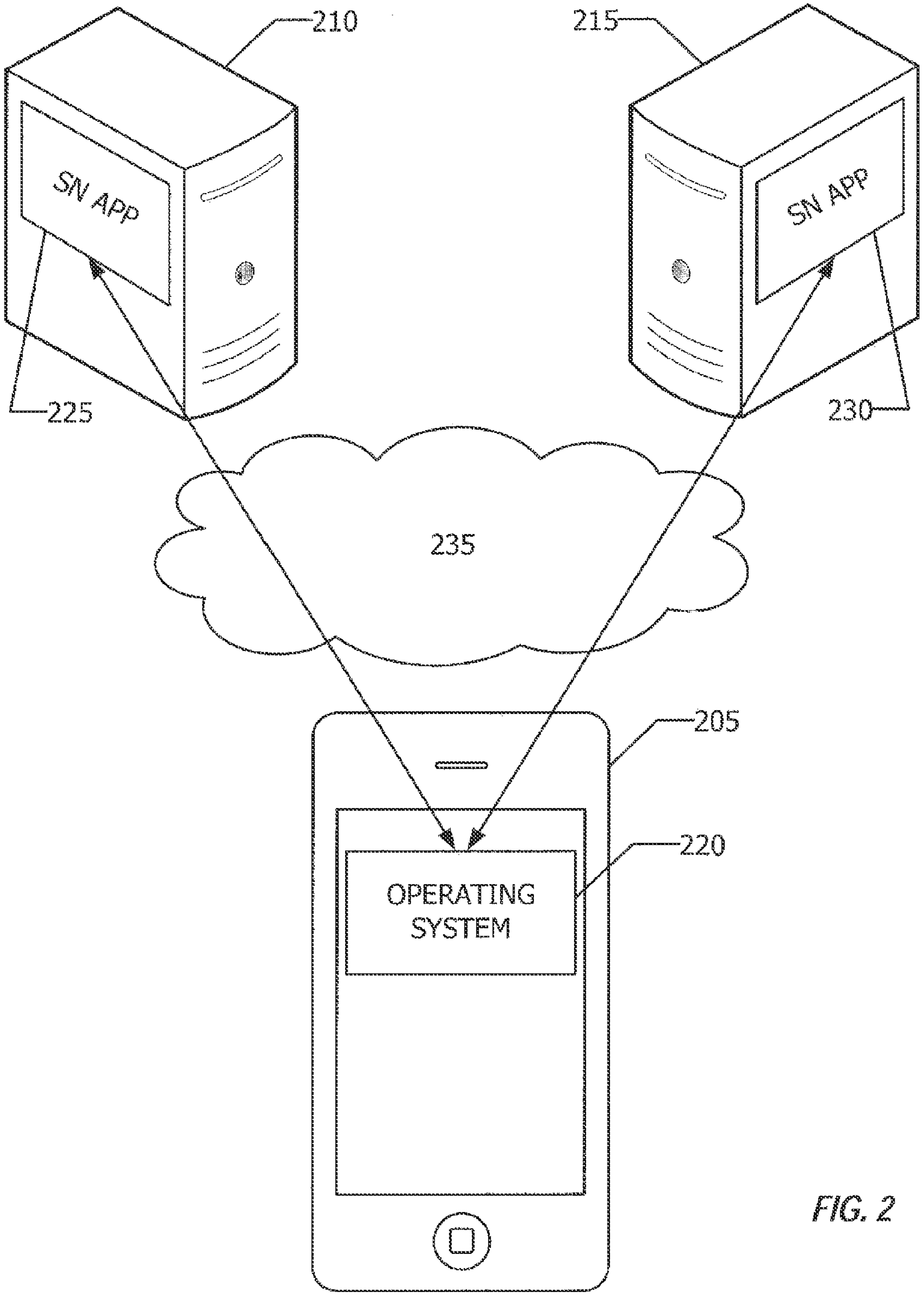
FIG. 2 is a block diagram illustrating the various components involved in the communication of social network messages from a mobile device to multiple social network platforms in accordance with one embodiment.

Referring to FIG. 2, a block diagram illustrates communication between mobile device 205 and social network servers 210 and 215. By way of example, device 205 may be a personal digital assistant (PDA), personal music player, mobile telephone, or a notebook, laptop or tablet computer system and is described in greater detail below with respect to FIG. 5. Central to the operation of mobile device 205 is mobile device operating system 220. In the illustrated embodiment, operating system 220 communicates directly (through a network interface of mobile device 205) over network 235 with first server-side social network application 225 and second server-side social network application 230 executing on social network servers 210 and 215, respectively (hereinafter first social network platform 225 and second social network platform 230). Network 235 may take any form including, but not limited to, a local area network (LAN), a wide area network (WAN) such as the Internet or a combination of local and wide-area networks. Further, network 235 may use any desired technology (wired, wireless or a combination thereof) and protocol (e.g., transmission control protocol, TCP). In the illustrated embodiment, communications between device 205, first social network server 210 and second social network server 215 are depicted as occurring over common network 235. In an alternate embodiment, device 205 may communicate with first social network server 210 using a first network and with second social network server 215 using a second network.

A user may have a first social network account with first social network platform 225 and a second social network account with second social network platform 230. For example, the user may have a Facebook account and a Twitter account. Although FIG. 2 illustrates device 205 communicating with two social network platforms, it will be understood that device 205 may communicate with additional social network platforms (corresponding to a user's additional social network accounts) in a similar manner. Furthermore, as will be described in greater detail below, mobile device operating system 220 may identify each of a user's social network accounts and provide a single interface that allows the user to communicate with each of the social network accounts.

Figure 3:
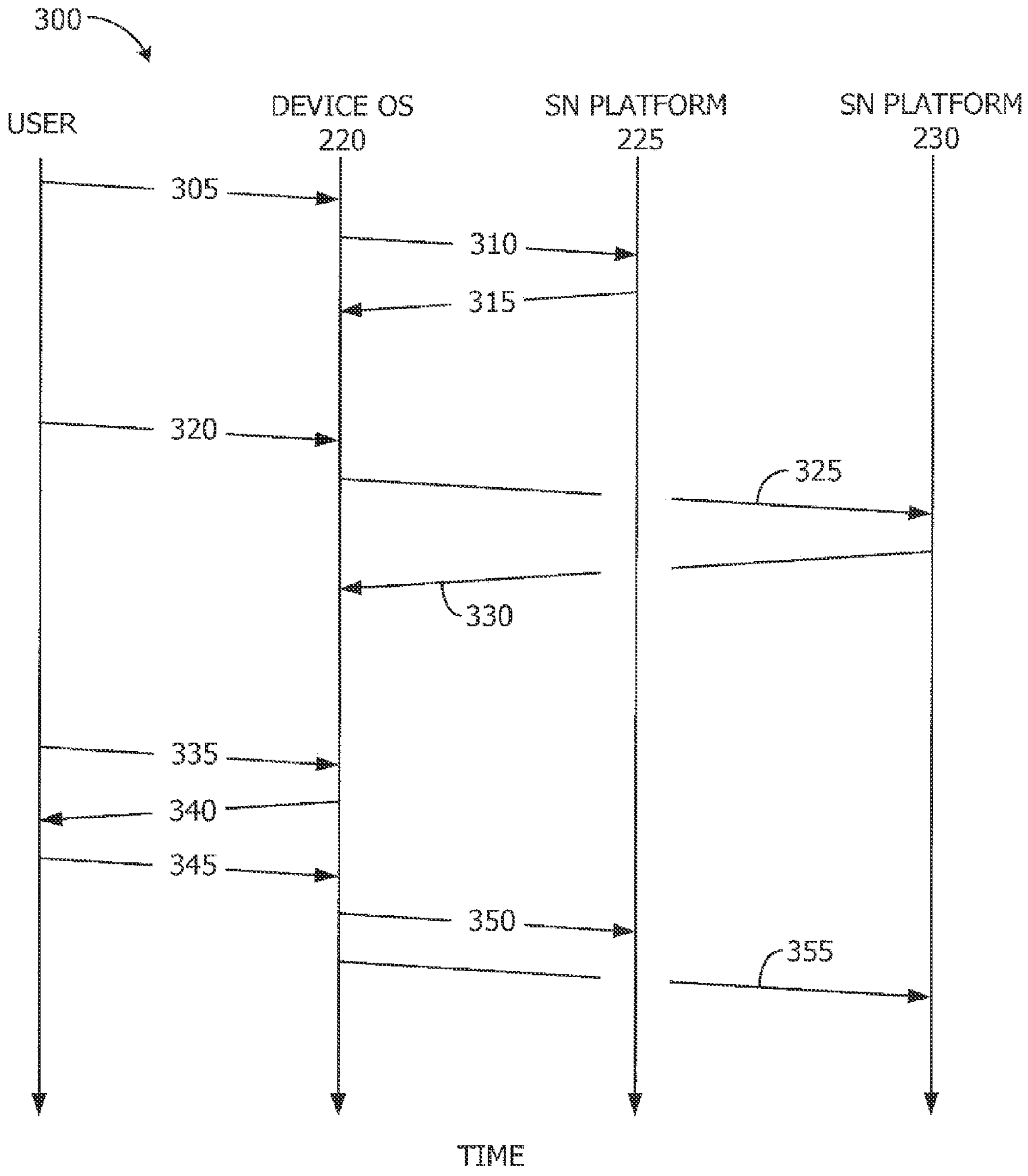
FIG. 3 is a communication flow diagram illustrating the flow of information in obtaining a user's social network credentials for multiple social network accounts and communicating a social network message using the social network accounts in accordance with one embodiment.

Referring to FIG. 3, illustrative process 300 illustrates the communication of information between a user of mobile device 205, mobile device operating system 220, first social network platform 225, and second social network platform 230. Process 300 illustrates the establishment of communication between operating system 220 and a user's accounts with social network platforms 225 and 230, the provision of an operating system interface that allows the user to communicate a social network message via each of the social network accounts, and the communication of the message entered by the user from mobile device operating system 220 via social network platforms 225 and 230.

Operating system 220 obtains a user's social network credentials for a social network account of the user (305). As described above with respect to FIG. 1, the social network credentials may be obtained as a direct input from the user or automatically by operating system 220. Operating system 220 may determine that the obtained credentials correspond to a first social network account associated with first social network platform 225. Based on this determination, operating system 220 may request a first social network token to allow operating system 220 to access the user's social network account at first social network platform 225 and to communicate messages via the user's social network account on behalf of the user (310). Request 310 may include the obtained social network credentials. If the request is properly authenticated (e.g., the social network credentials correspond to an active social network account at social network platform 225 and the user consents to the provision of the social network token), first social network platform 225 may provide the first social network token through reply 315. As set forth above, the first social network token may allow operating system 220 to communicate social network messages via the user's social network account at first social network platform 225.

The first social network token may be stored in a memory of mobile device 205 for subsequent use in communicating social network messages via the first social network account on behalf of the user. In one embodiment, the social network token may be stored in a memory location that is designated for use only by operating system 220. In another embodiment, the social network token may be stored in a memory location that is only accessible to operating system 220.

In one embodiment, the social network token may be stored in a memory location that is dedicated to storing a social network token obtained from first social network platform 225. Presence of a social network token in the dedicated memory location for first social network platform 225 may enable operating system 220 to determine that the user has a social network account through first social network platform 225 and that the operating system interface should provide an option to communicate a social network message using that account.

After the passage of some time, the user may establish a second social network account with second social network platform 230 (or decide to provide credentials for an existing account with second social network platform 230). In a like manner to the process described above with respect to the user's first social network platform account, operating system 220 may obtain the credentials for the second social network platform account (320), request a second social network token from second social network platform 230 (325), and receive the requested token (330). The second social network token may also be stored in a memory of device 205 for subsequent use in communicating social network messages via the second social network account on behalf of the user. The second social network token may be stored in a memory location dedicated to storing a social network token obtained from second social network platform 230. Therefore, in one embodiment, presence of a token in the dedicated area of memory for each of the first social network platform account and the second social network platform account may indicate that the user has both a first social network platform account and a second social network platform account and that the operating system interface should provide an option to communicate a social network message using either or both accounts. It should be noted that although FIG. 3 illustrates the setup process for each of two social network accounts, the setup process may be repeated for any number of social network accounts that are supported by operating system 220. Therefore, a user may provide social network credentials for any number of supported social network platforms to enable direct communication of social network messages via any or all of the user's social network accounts through the operating system interface. In one embodiment, operating system 220 may support the integration of multiple accounts with the same social network platform (e.g., two or more separate accounts with first social network platform 225). It should be noted that each social network token may be associated with a single social network account on a single social network platform. Therefore, a separate social network token may be stored in a memory of mobile device 205 for each social network account for which direct social network communications through the operating system interface have been set up.

At some point, the user navigates 335 to an operating system interface that supports the communication of social network messages through one or more social network accounts that have been set up on device 205. Navigation to the operating system interface by the user may occur based on a touch gesture performed on a touch screen of device 205, selection of an operating system icon, a keystroke from a user interface of device 205, etc. In response, operating system 220 displays the appropriate interface 340. Display of the appropriate interface may include determining which, if any, social network accounts have been set up on device 205. In one embodiment, the interface may only display an option to communicate a message via a certain social network platform if the user has set up an account for that platform. In another embodiment, the interface may display multiple social network platforms but only those for which the user has set up an account may be selectable. As set forth above, in one embodiment, operating system 220 may determine which social network accounts have been set up by the user based on the presence of social network tokens in a dedicated memory location of device 205. For example, presence of a social network token in a first dedicated area of memory may indicate that a user has set up an account for first social network platform 225 on device 205. In another embodiment, an operating system setting may indicate which social network accounts have been set up on device 205. These settings may be updated when operating system 220 receives a new token for a social network account or in the event a token is deleted or otherwise becomes inactive (e.g., after a specified amount of time).

Through the operating system interface, a user may create a social network message 345. In one embodiment, the operating system interface may display a text entry field in response to a user's selection of a particular social network account. In another embodiment, the operating system interface may additionally support the attachment of digital media (e.g., a photo, an audio file, a video file, etc.) to the message created by the user. In the illustrated embodiment, the user has selected to communicate a single message through both of the social network accounts that they have set up on device 205. Therefore, in response to the completion of the user's message (e.g., in response to the user selecting a transmit selector), operating system 220 retrieves the first social network token and sends 350 the user-created message along with the first social network token to first social network platform 225. Because the first social network token uniquely identifies the user's account, the message is communicated via the user's social network account just as if the user had created the message through a web interface of the first social network platform or through a client-side application for the first social network platform. In a similar manner, operating system 220 retrieves the second social network token and sends 355 the user-created message along with the second social network token to second social network platform 230. The same message is therefore communicated via the user's social network accounts with first social network platform 225 and second social network platform 230.

Figure 4:
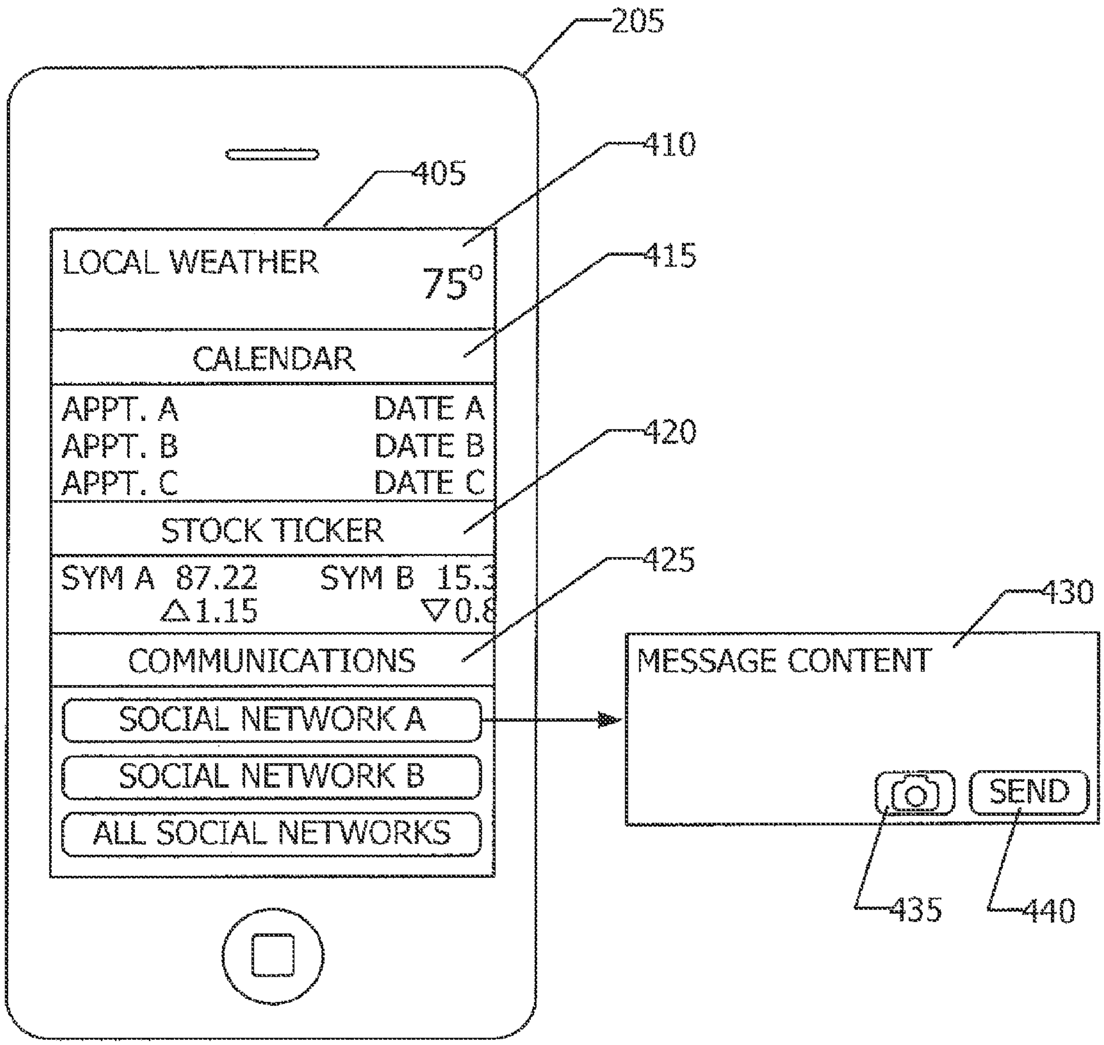
FIG. 4 illustrates an example operating system interface that allows a user to create a message to be communicated via one or more of the user's social network accounts in accordance with one embodiment.

Referring to FIG. 4, an example information center interface 405 of operating system 220 is customizable to include information that is of interest to the user. Navigation to information center interface 405 may occur based on a touch gesture performed on a touch screen of device 205, selection of an operating system icon, a keystroke from a user interface of device 205, etc. In the illustrated embodiment, information center interface 405 includes weather section 410, calendar section 415, stock ticker section 420, and communications section 425. Weather section 410 may be customizable by the user of mobile device 205 to include one or more specified locales (e.g., local weather information). Calendar section 415 may display the user's upcoming appointments and/or reminders. Stock ticker section 420 may scroll stock prices for stocks that are of interest to the user. Finally, communications section 425 may display an option to create a social network message to be communicated from one or more of the social network accounts that have been set up on device 205 (e.g., according to the process described above). In one embodiment, communications section 425 may display a selectable icon for each of the social network accounts or platforms that have been set up on device 205 as well as a selectable icon representing all of the social network accounts that have been set up on device 205. In another embodiment, communications section 425 may display a checkbox for each of the social network accounts that have been set up on device 205, enabling a user to select multiple social network accounts. By selecting an icon or checkbox corresponding to one of the social network accounts or platforms (or multiple social network accounts or platforms), a text entry display 430 may be displayed on a display element of mobile device 205. Text entry display 430 may include an attachment selector 435 and a transmit selector 440. Attachment selector 435 may be used to attach digital media (e.g., a photo, video file, audio file, etc.) to a generated social network message. The user may compose a message within text entry display 430 and the message (and any attachments) may be communicated via the selected social network account(s) upon selection of transmit selector 440. It should be noted that information center interface 405 is merely an example of an operating system interface from which a social network message can be created and is not intended to be limiting in any manner. Rather, the above-described technique may be utilized to allow a user to generate a social network message through any operating system interface. As illustrated in FIG. 4, the techniques disclosed herein enable a user of a mobile device to create a social network message to be communicated through one or more of the user's social network accounts through a direct operating system interface. Therefore, a mobile device user need not launch a client-side social network application or even have such an application installed on the mobile device to generate a social network message.

Figure 5:
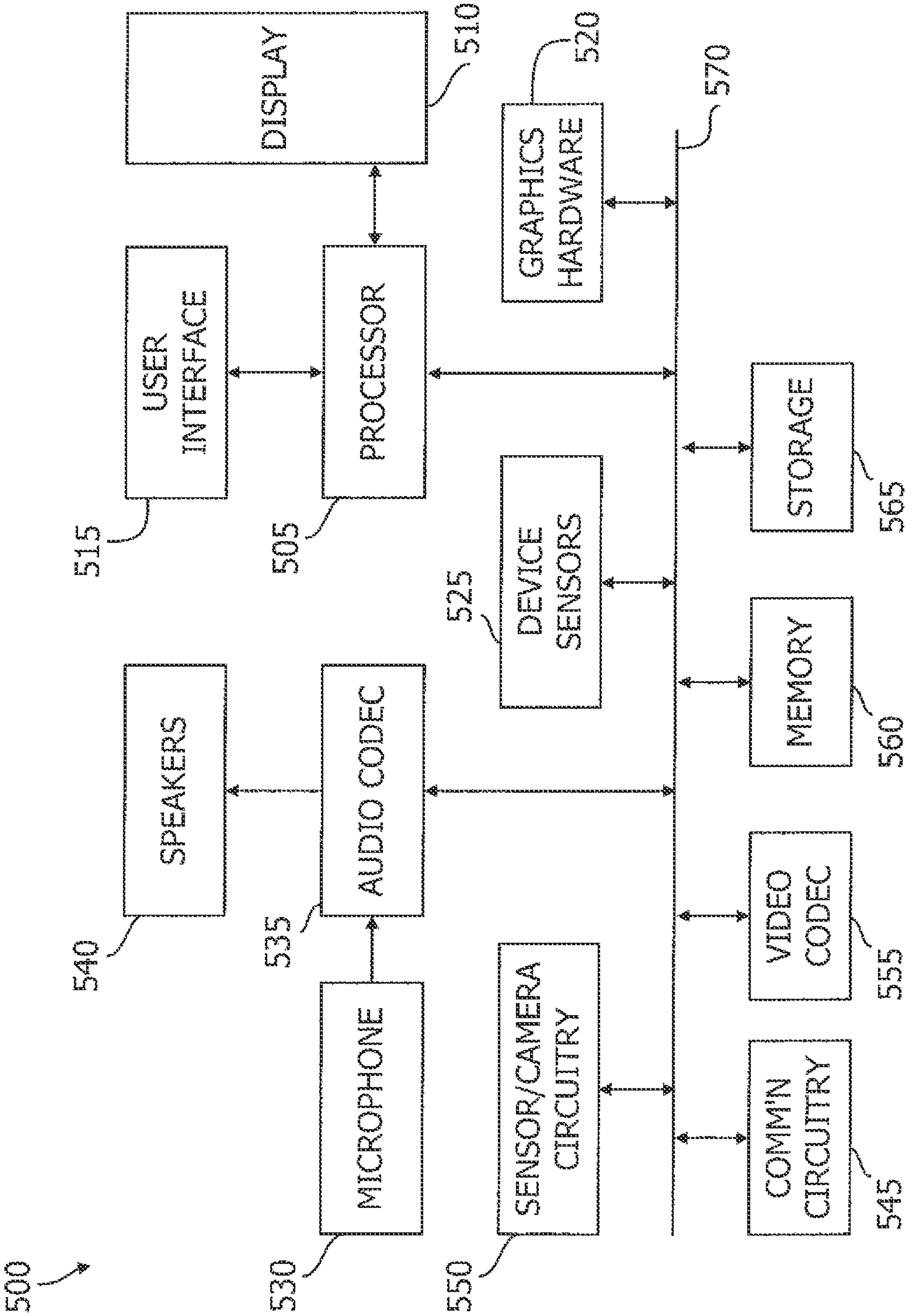
FIG. 5 is a block diagram illustrating an electronic device in accordance with one embodiment.

Referring to FIG. 5, a simplified functional block diagram of illustrative electronic device 500 is shown according to one embodiment. Electronic device 500 may include processor 505, display 510, user interface 515, graphics hardware 520, device sensors 525 (e.g., proximity sensor/ambient light sensor, accelerometer and/or gyroscope), microphone 530, audio codec(s) 535, speaker(s) 540, communications circuitry 545, digital image capture unit 550, video codec(s) 555, memory 560, storage 565, and communications bus 570. Electronic device 500 may be, for example, a personal digital assistant (PDA), personal music player, mobile telephone, notebook, laptop or a tablet computer, desktop computer, or server computer. More particularly, mobile device 205 and social network servers 210 and 215 may each take the form of electronic device 500.

Processor 505 may execute instructions necessary to carry out or control the operation of many functions performed by device 500. Processor 505 may, for instance, drive display 510 and receive user input from user interface 515. For example, user interface 515 can take a variety of forms, such as a button, keypad, dial, a click wheel, keyboard, display screen and/or a touch screen. Processor 505 may also, for example, be a system-on-chip such as those found in mobile devices and include a dedicated graphics processing unit (GPU). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 to process graphics information. In one embodiment, graphics hardware 520 may include a programmable graphics processing unit (GPU).

Sensor and camera circuitry 550 may capture still and video images that may be processed, at least in part, by video codec(s) 555 and/or processor 505 and/or graphics hardware 520, and/or a dedicated image processing unit incorporated within circuitry 550. Images so captured may be stored in memory 560 and/or storage 565. Memory 560 may include one or more different types of media used by processor 505 and graphics hardware 520 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to tangibly retain computer program instructions or code organized into one or more modules and written in any desired computer programming language. When executed by, for example, processor 505 such computer program code may implement one or more of the methods described herein.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. At least one non-transitory program storage device, readable by at least one processor and comprising operating system instructions stored thereon to cause the at least one processor to:

obtain access parameters for one or more social network accounts through one or more user interfaces, the one or more user interfaces presented by one or more client-side social network applications, wherein the one or more client-side social network applications are associated with text message communication;

store, by an operating system, a mobile device identifier, the mobile device identifier being associated with a mobile device;

obtain, by the operating system, a permission to transfer the access parameters from the one or more client-side social network applications to a memory of the mobile device that is designated for use only by the operating system;

transfer, by the operating system, the obtained access parameters from the one or more client-side social network applications to the memory of the mobile device that is designated for use only by the operating system;

receive, by the operating system, a social network response message manually entered by a user through a second user interface, wherein the second user interface is directly presented by the operating system without accessing the one or more client-side social network applications; and cause transmission, by the operating system, of the social network response message, the access parameters and the mobile device identifier directly to a first server-side social network application using at least one of the one or more social network accounts without intervention of the one or more client-side social network applications.

2. The at least one non-transitory program storage device of claim 1, wherein the access parameters are transmitted to the first server-side social network application in an encrypted format.

3. The at least one non-transitory program storage device of claim 1, wherein the operating system instructions to cause the at least one processor to obtain the social network credentials for the one or more social network accounts comprise operating system instructions to cause the at least one processor to prompt the user to enter each of the one or more social network credentials through one of the one or more user interfaces that correspond to the social network accounts.

4. The at least one non-transitory program storage device of claim 1, wherein the operating system instructions to cause the at least one processor to obtain the access parameters comprise operating system instructions to cause the at least one processor to:

obtain, from one of the one or more user interfaces, a social network credential corresponding to a first social network account;

send the social network credential to the first server-side social network application; and receive, from the first server-side social network application and in response to the sent social network credential, a social network token corresponding to the first social network account.

5. The at least one non-transitory program storage device of claim 1, wherein the memory that is designated for use only by the operating system is further dedicated to storing the access parameters for the one or more social network accounts.

6. The at least one non-transitory program storage device of claim 1, wherein the operating system instructions to cause the processor to receive the social network response message through a second user interface of the operating system further comprise operating system instructions to cause the at least one processor to determine one or more social network platforms to which the one or more social network accounts correspond.

7. The at least one non-transitory program storage device of claim 6, further comprising operating system instructions to cause the at least one processor to display only the one or more social network platforms to which the one or more social network accounts correspond.

8. The at least one non-transitory program storage device of claim 1, wherein the operating system instructions to cause the at least one processor to cause transmission of the social network response message comprise operating system instructions to cause the at least one processor to cause transmission of the social network response message via a plurality of the one or more social network accounts.

9. A mobile electronic device, comprising:

a display;

a network communications circuit;

one or more processors connected to the display and the network communications circuit; and a memory connected to the display, the network communications circuit and the one or more processors, wherein the memory includes operating system instructions and client application instructions, and further wherein the memory includes a first portion restricted to use by an operating system and a second portion of memory that the client application instructions can access, the operating system instructions configured to cause the one or more processors to:

obtain access parameters for one or more social network accounts through one or more user interfaces, the one or more user interfaces presented by one or more client-side social network applications, wherein the one or more client-side social network applications are associated with text message communication, store a device identifier, the device identifier being associated with the mobile electronic device;

obtain a permission to transfer the access parameters from the one or more client-side social network applications to the first portion of the memory of the mobile electronic device that is designated for use only by the operating system;

transfer the obtained access parameters from the one or more client-side social network applications to the first portion of the memory that is designated for use only by the operating system, receive, through a second user interface, a social network response message manually entered by a user, wherein the second user interface is directly presented by the operating system without accessing the one or more client-side social network applications, and transmit the social network response message, the access parameters and the device identifier directly to a first server-side social network application through the network communication circuit using at least one of the one or more social network accounts, without intervention of the one or more client-side social network applications.

10. The mobile electronic device of claim 9, wherein the access parameters are transmitted to the first server-side social network application in an encrypted format.

11. The mobile electronic device of claim 9, wherein the operating system instructions configured to cause the one or more processors to obtain the social network credentials comprise operating system instructions configured to cause the one or more processors to:

prompt the user, through the one or more user interfaces, to enter a network credential for each of the one or more social network accounts;

transmit, through the network communications circuit, at least one of the one or more social network credentials to a corresponding server-side social network application; and receive, through the network communications circuit and in response to the transmitted at least one of the one or more social network credentials, a social network token corresponding to each of the at least one or more social network accounts.

12. The mobile electronic device of claim 11, further comprising operating system instructions configured to cause the one or more processors to store each of the received social network tokens in the first portion of memory.

13. The mobile electronic device of claim 11, wherein the operating system instructions configured to transmit the social network response message comprise operating system instructions configured to transmit the social network response message through the network communication circuit to each of the one or more social network accounts.

14. The mobile electronic device of claim 9, wherein the network communications circuit comprises a wireless network communications circuit.

15. A method, comprising:

obtaining access parameters for one or more social network accounts through one or more user interfaces, the one or more user interfaces presented by one or more client-side social network applications, wherein the one or more client-side social network applications are associated with text message communication;

storing, by an operating system, a mobile device identifier, the mobile device identifier being associated with a mobile device;

obtain, by the operating system, a permission to transfer the access parameters from the one or more client-side social network applications to a memory of the mobile device that is designated for use only by the operating system;

transferring, by the operating system, the access parameters from the one or more client-side social network applications to the memory of the mobile device that is designated for use only by the operating system;

receiving, by the operating system, a social network response message manually entered by a user through a second user interface of the operating system, wherein the second user interface is directly presented by the operating system without accessing the one or more client-side social network applications; and transmitting, by the operating system, each of the social network response message, the access parameters and the mobile device identifier directly with a first server-side social network application using at least one of the one or more social network accounts, without intervention of the one or more client-side social network applications.

16. The method of claim 15, wherein the access parameters are transmitted to the first server-side social network application in an encrypted format.

17. The method of claim 16, wherein obtaining the social network credentials comprises prompting the user to enter each of the one or more social network credentials through one of the one or more user interfaces that corresponds to the social network accounts.

18. The method of claim 15, wherein obtaining the access parameters comprises:

obtaining, from one of the one or more user interfaces, a social network credential corresponding to a first social network account;

sending the social network credential to the first server-side social network application; and receiving, from the first server-side social network application and in response to the sent social network credential, a social network token corresponding to the first social network account.

19. The method of claim 15, wherein the memory that is designated for use only by the operating system is further dedicated to storing the access parameters for the one or more social network accounts.

20. The method of claim 15, wherein receiving the social network response message through a second user interface of the operating system further comprises determining one or more social network platforms to which the one or more social network accounts correspond.

21. The method of claim 20, further comprising displaying only the one or more social network platforms to which the one or more social network accounts correspond.

22. The method of claim 15, wherein communicating the social network response message comprises communicating the social network response message via a plurality of the one or more social network accounts.

* * * * *